(12) United States Patent
Chen et al.

(10) Patent No.: US 12,321,522 B2
(45) Date of Patent: Jun. 3, 2025

(54) ELECTRONIC DEVICE AND METHOD FOR EXTERNAL FORCE RECOGNITION AND TACTILE FEEDBACK FOR ELECTRONIC DEVICE

(71) Applicant: BEIJING XIAOMI MOBILE SOFTWARE CO., LTD., Beijing (CN)

(72) Inventors: Jing Chen, Beijing (CN); Xiaosheng Cui, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 18/470,741

(22) Filed: Sep. 20, 2023

(65) Prior Publication Data
US 2024/0393880 A1 Nov. 28, 2024

(30) Foreign Application Priority Data
May 24, 2023 (CN) .......................... 202310594871.X

(51) Int. Cl.
*G06F 3/01* (2006.01)
(52) U.S. Cl.
CPC .................................. *G06F 3/016* (2013.01)
(58) Field of Classification Search
None
See application file for complete search history.

(56) References Cited

U.S. PATENT DOCUMENTS

| | | | |
|---|---|---|---|
| 11,775,073 B1 * | 10/2023 | Tang | G06F 3/167 |
| | | | 345/174 |
| 2007/0043725 A1 | 2/2007 | Hotelling et al. | |
| 2019/0041991 A1 | 2/2019 | Hotelling et al. | |

FOREIGN PATENT DOCUMENTS

WO WO 2022/193583 A1 9/2022

OTHER PUBLICATIONS

Extended European Search Report issued Feb. 16, 2024, in corresponding European Patent Application No. 23198736.3, 8 pages.

* cited by examiner

*Primary Examiner* — Stephen T. Reed
(74) *Attorney, Agent, or Firm* — Oblon, McClelland, Maier & Neustadt, L.L.P.

(57) ABSTRACT

An electronic device that can include a device main body, a button on the device main body and at least partially exposed out of the device main body, and an external force recognition and tactile feedback component inside the device main body and opposite to the button. The external force recognition and tactile feedback component can recognize a magnitude of an external force and perform a corresponding tactile feedback action based on the recognized magnitude of the external force, when the button is subjected to the external force. An external force recognition and tactile feedback method for an electronic device includes recognizing a magnitude of an external force, and performing a corresponding tactile feedback action based on the recognized magnitude of the external force.

15 Claims, 8 Drawing Sheets

ELECTRONIC DEVICE AND METHOD FOR EXTERNAL FORCE RECOGNITION AND TACTILE FEEDBACK FOR ELECTRONIC DEVICE

CROSS-REFERENCE TO RELATED APPLICATION

This application is based on and claims priority to Chinese Patent Application No. 202310594871.X filed on May 24, 2023, the entire content of which is incorporated herein by reference.

BACKGROUND

Technical Field

Mobile phones, computers, wearable devices and other electronic devices are often equipped with buttons to assist users in completing certain functions, such as volume adjustment buttons and on/off buttons. The existing buttons are mostly simple mechanical buttons and can only realize a simple pressing action.

SUMMARY

The present disclosure relates to the field of terminals, and more particularly to an electronic device and an external force recognition and tactile feedback method for the electronic device.

The present disclosure provides an electronic device. The electronic device includes a device main body, a button on the device main body and at least partially exposed out of the device main body, and an external force recognition and tactile feedback component inside the device main body and opposite to the button. The external force recognition and tactile feedback component is configured to recognize a magnitude of an external force and perform a corresponding tactile feedback action based on the recognized magnitude of the external force, when the button is subjected to the external force.

The present disclosure further provides an external force recognition and tactile feedback method for an electronic device. The external force recognition and tactile feedback method includes recognizing a magnitude of an external force, and performing a corresponding tactile feedback action based on the recognized magnitude of the external force.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
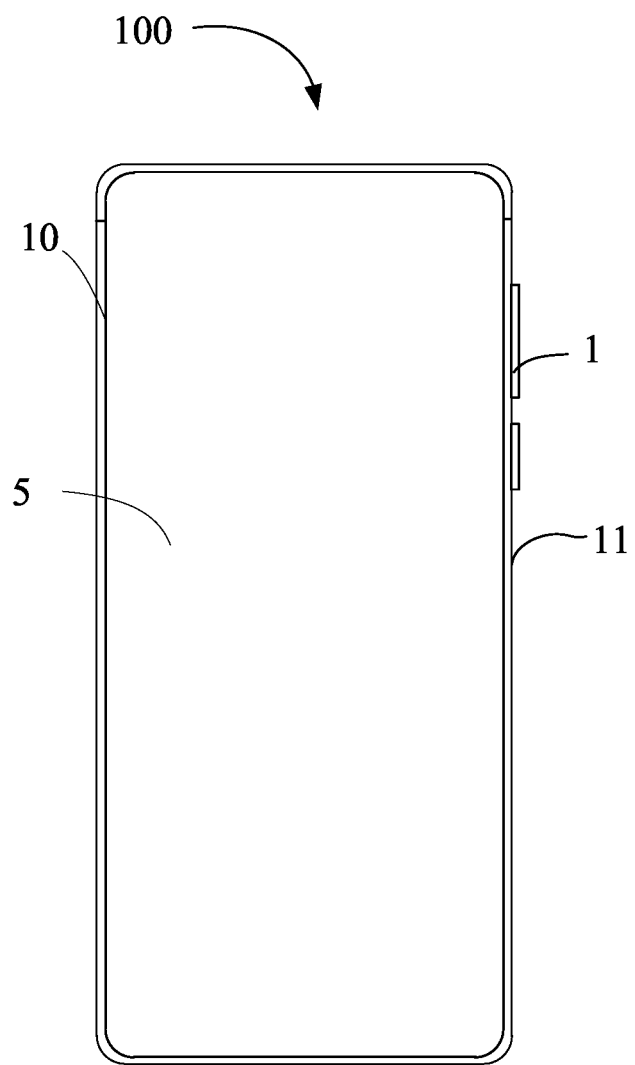
FIG. 1 is a front view of an electronic device according to an embodiment.
Figure 2:
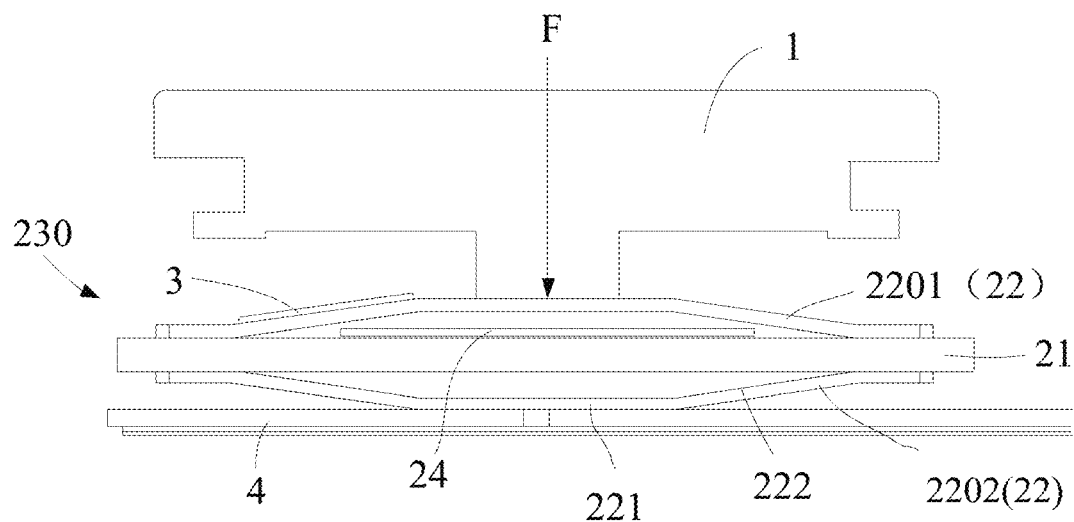
FIG. 2 is a schematic view of a partial structure of an electronic device according to an embodiment.
Figure 3:
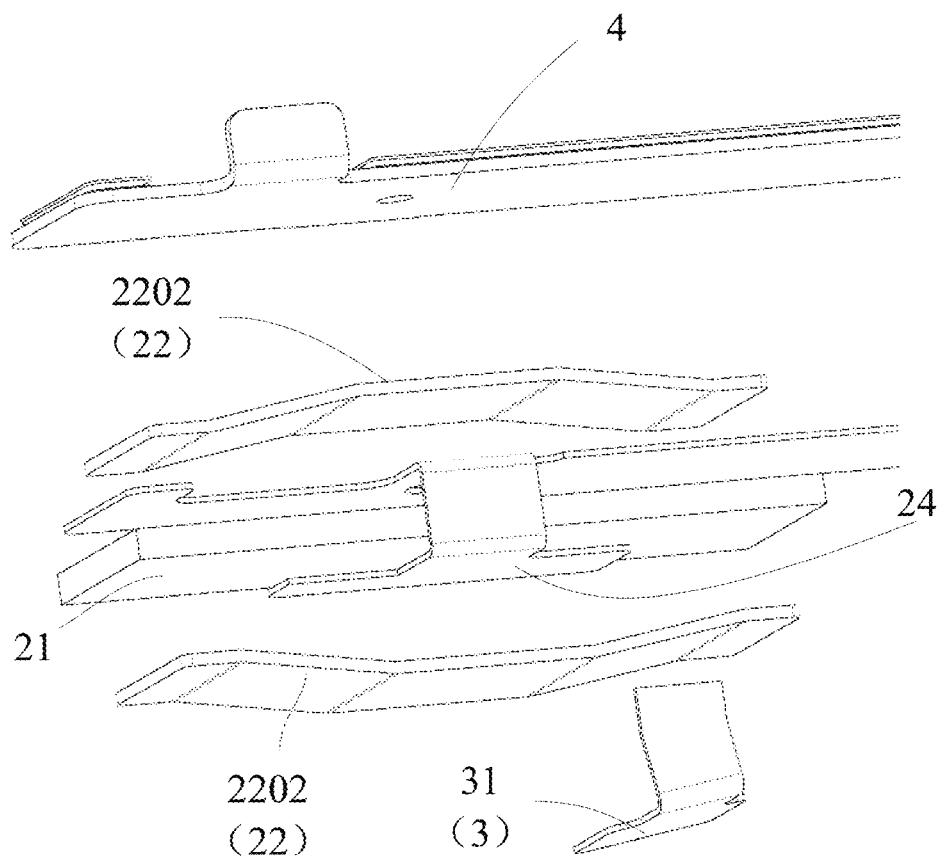
FIG. 3 is an exploded view of a partial structure of an electronic device according to an embodiment.

Referring now to the drawings, wherein like reference numerals designate identical or corresponding parts throughout the several views.

Embodiments of the present disclosure will be described in detail and examples thereof will be shown in drawings. The following description refers to the accompanying drawings in which the same numbers in different drawings represent the same or similar elements unless otherwise represented. Implementations set forth in the following description of the embodiments do not represent all implementations consistent with the present disclosure. Instead, they are merely examples of devices and methods consistent with aspects of the present disclosure as recited in the appended claims.

Terms in the present disclosure are merely for the purpose of describing specific embodiments, and are not intended to limit the present disclosure. As used in embodiments of the present disclosure and the appended claims, singular forms "a/an", "said" and "the" are also intended to include plural forms, unless otherwise clearly specified in the context. It should also be understood that the term "and/or" as used herein is intended to include any or all possible combinations of one or more associated listed items.

It should be understood that, depending on the context, the word "if" as used herein may be construed to mean "when" or "upon" or "in response to determining".

The present disclosure provides an electronic device and an external force recognition and tactile feedback method for the electronic device. The electronic device includes a device main body, a button, and an external force recognition and tactile feedback component. The button is on the device main body and is at least partially exposed out of the device main body. The external force recognition and tactile feedback component is inside the device main body and opposite to the button. When the button is subjected to an external force, the external force recognition and tactile feedback component can recognize a magnitude of the external force, and perform a corresponding tactile feedback action based on the recognized magnitude of the external force. For the electronic device and the external force recognition and tactile feedback method for the electronic device, since the external force recognition and tactile feedback component can recognize the magnitude of the external force and perform the corresponding tactile feedback action based on the recognized magnitude of the external force when the button is subjected to the external force, a user can perceive an action result of a button operation based on the tactile feedback action after the button operation (i.e., perceive whether the button operation is successful), and can also perceive whether the button operation is incorrect based on the tactile feedback action. Hence, user experience can be improved.

The electronic device mentioned herein may be a mobile phone, a tablet computer, a wearable device, etc.

The electronic device and the external force recognition and tactile feedback method for the electronic device in the present disclosure will be described in detail with reference to FIGS. 1 to 16.

Referring to FIG. 1 in conjunction with FIGS. 2 to 14 when necessary, an electronic device 100 includes a device main body 10, a button 1, and an external force recognition and tactile feedback component 230. The button 1 is on the device main body 10 and is at least partially exposed out of the device main body 10. The external force recognition and tactile feedback component 230 is inside the device main body 10 and opposite to the button 1. When the button 1 is subjected to an external force F, the external force recognition and tactile feedback component 230 can recognize a magnitude of the external force F, and perform a corresponding tactile feedback action based on the recognized magnitude of the external force F.

The electronic device 100 is exemplified as a mobile phone. The electronic device 100 has a display screen 5 on the device main body 10. The device main body 10 has a side frame 11. The button 1 is on the side frame 11 and is exposed from the side frame 11.

The button 1 may be a volume button for adjusting sound volume, an on-off button, etc.

In some embodiments, the tactile feedback action includes vibration. Different tactile feedback actions may be distinguished by adjusting a vibration magnitude or a vibration frequency, or by combining the vibration magnitude with the vibration frequency. Accordingly, for example, tactile feedback actions corresponding to different magnitudes of the external force F may be tactile feedback actions having different vibration magnitudes. As another example, tactile feedback actions corresponding to different magnitudes of the external force F may be tactile feedback actions having different vibration frequencies.

In some embodiments, a strength of the tactile feedback action is positively correlated to the magnitude of the external force F exerted on the button 1. That is, the greater the external force F is, the stronger the tactile feedback action is, and the more obvious the tactile feedback action felt by the user is; on the contrary, the smaller the external force F is, the weaker the tactile feedback action is, and the softer the tactile feedback action felt by the user is.

Here, the strength of the tactile feedback action is reflected by difference in at least one of the vibration magnitude or the vibration frequency. As reflected by the vibration magnitude, the greater the vibration magnitude is, the stronger the tactile feedback action is; the smaller the vibration magnitude is, the weaker the tactile feedback action is. As reflected by the vibration frequency, the higher the vibration frequency is, the stronger the tactile feedback action is; the lower the vibration frequency is, the weaker the tactile feedback action is.

For example, regarding tactile feedback actions corresponding to different magnitudes of the external force F, if the vibration magnitude is used to reflect the tactile feedback actions, the vibration magnitude is set to be directly proportional to the external force F.

As another example, regarding tactile feedback actions corresponding to different magnitudes of the external force F, if the vibration frequency is used to reflect the tactile feedback actions, the vibration frequency is set to be directly proportional to the external force F.

It can be understood that, in the electronic device, the external force F and corresponding different tactile feedback actions can be preset and stored in a correspondence relationship. After the external force recognition and tactile feedback component 230 recognizes the external force F, the tactile feedback action corresponding to the external force F is determined based on the stored correspondence relationship, and the corresponding tactile feedback action is performed.

As described above, in some electronic devices, different tactile feedback actions may be set directly based on the magnitude of the external force F.

In some electronic devices, the button operation is generally performed in one or more operation types, such as long pressing, tapping, and sliding. In such electronic devices, several corresponding tactile feedback actions are set based on these operation types, and for example, each operation type corresponds to one kind of tactile feedback action. As a result, the user can operate the button according to particular needs and can judge whether the desired operation is successful or not based on the tactile feedback action.

In some embodiments, the external force recognition and tactile feedback component 230 determines an operation type of the external force based on the recognized magnitude of the external force F, and performs the tactile feedback action corresponding to the operation type of the external force based on the determined operation type of the external force.

Correspondingly, different action force ranges are designated for different operation types based on the user's habits. For example, different operation types correspond to different magnitudes of the external force and different operation duration thresholds of the external force. After the external force recognition and tactile feedback component 230 recognizes the magnitude of the external force, it is possible to determine what operation type the external force is based on the magnitude of the external force, and perform the tactile feedback action corresponding to the operation type.

For example, there are two operation types of pressing and sliding for the button. In some embodiments, an external force F having a magnitude of 100 gf to 400 gf and an operation duration of less than 0.2 S (second) may be set as pressing, and an external force having a magnitude of less than 50 gf (e.g., 10 gf) and an operation duration of less than 0.5 S may be set as sliding.

A first tactile feedback action and a second tactile feedback action are designated for the two operation types of pressing and sliding, respectively. For example, the first tactile feedback action corresponds to pressing is stronger, while the second tactile feedback action corresponding to sliding is weaker. For example, when the external force recognition and tactile feedback component 230 obtains an external force F of 10 gf, the operation type of the button can be determined as sliding based on the external force F, and then the second tactile feedback action is performed.

It can be understood that, in the embodiments, the external force F and the corresponding operation types, as well as the different tactile feedback actions corresponding to the different operation types may be preset and stored in a correspondence relationship. Accordingly, after the external force F is recognized by the external force recognition and tactile feedback component 230, the operation type corresponding to the external force F is determined based on the stored correspondence relationship, the corresponding tactile feedback action is determined based on the operation type, and the corresponding tactile feedback action is performed.

Referring to FIGS. 2 to 8, in some embodiments, the external force recognition and tactile feedback component 230 includes a support member 4, a tactile feedback structure 2 on the support member 4, and at least one pressure sensor 3 on the tactile feedback structure 2.

The pressure sensor 3 recognizes the magnitude of the external force F when the button 1 is subjected to the external force F, and the tactile feedback structure 2 performs the corresponding tactile feedback action based on the magnitude of the external force F recognized by the pressure sensor 3.

The support member 4 mentioned here has a plate-like construction. Taking a mobile phone as an example, the support member 4 is arranged inside the electronic device 100 through a connector, or is arranged relying on a middle frame structure.

Referring to FIGS. 5-8 and 12, in some embodiments, the tactile feedback structure 2 includes a tactile feedback body 21 capable of performing the tactile feedback action, a touch control driver 23 capable of controlling the tactile feedback body 21 to perform the tactile feedback action, and at least one resilient sheet 22 on the tactile feedback body 21. The resilient sheet 22 is deformed when the button 1 is subjected to the external force F. The touch control driver 23 is electrically connected to the pressure sensor 3.

The pressure sensor 3 is on the resilient sheet 22, and deformation of the resilient sheet 22 causes the pressure sensor 3 to recognize the magnitude of the external force F. The pressure sensor 3 sends a corresponding action instruction to the touch control driver 23 based on the recognized magnitude of the external force F, and the touch control driver 23 controls the tactile feedback body 21 to perform the corresponding tactile feedback action based on the action instruction. The action instruction includes an action start signal and a tactile feedback action type signal.

The button 1 is in contact with the resilient sheet 22. When the button 1 is subjected to the external force F, the external force F is transmitted inwardly to the resilient sheet 22, and the resilient sheet 22 is compressed and deformed under the external force F transmitted through the button 1.

The resilient sheet 22 is a metal sheet or a non-metal sheet having high elasticity. For example, the resilient sheet 22 is a steel sheet, such as SUS301 and SUS304 with a thickness of 0.1 to 0.2 mm, or a titanium alloy sheet with a thickness of 0.1 to 0.2 mm.

It can be understood that when an external resultant force exerted on the resilient sheet 22 is zero, that is, the external force F and a force for example from the tactile feedback body 21, exerted on the resilient sheet 22, disappear, the resilient sheet 22 can be restored to its initial state.

The resilient sheet 22 is a relatively smooth solid sheet-like structure or a sheet-like structure with holes or other limit structures.

The resilient sheet 22 is secured to a corresponding surface of the tactile feedback body 21 by an adhesive structure such as glue or tape.

Figure 8:
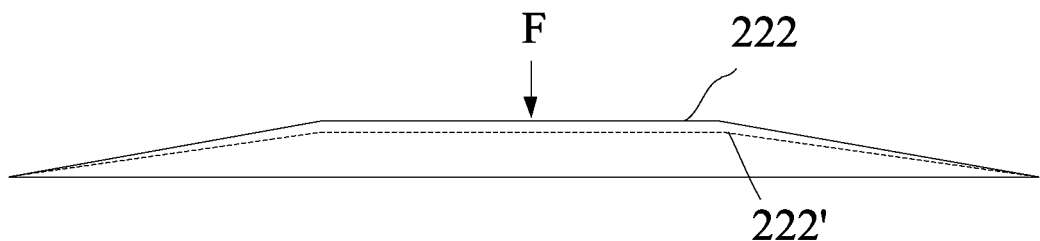
FIG. 8 is a schematic view of deformation of a resilient sheet according to an embodiment.

Referring to FIG. 8, the initial state of the resilient sheet 22 is a state shown by solid lines in FIG. 8, and the resilient sheet 22 is deformable to a position shown by dashed lines 22' in FIG. 8 after being subjected to the external force F.

In some embodiments, the tactile feedback body 21 is made of piezoelectric ceramics. For example, the piezoelectric ceramics is multilayer piezoelectric ceramics mainly composed of PZT.

Accordingly, the tactile feedback structure 2 is a piezoelectric motor.

Due to an overall fast response speed of the piezoelectric motor (typically starting within 1 ms), a vibration effect of the tactile feedback is timely by using the piezoelectric motor as the tactile feedback structure 2. Moreover, the material of the piezoelectric ceramics can endure relatively high driving voltages, and a small size can cause a large vibration acceleration G, i.e., a strong vibration sensation. The use of the piezoelectric motor is beneficial to controlling the overall size of the tactile feedback structure while achieving a strong tactile feedback. Furthermore, the piezoelectric ceramics generate the vibration by extension-retraction deformation, and the vibration of the piezoelectric motor made of the piezoelectric ceramics allows for a three-dimensional perception compared to a linear motor.

In other embodiments, a motor structure such as a linear motor may be used as the tactile feedback structure.

The tactile feedback body 21 is provided with an electrical connection key 2141 to be electrically connected to the touch control driver 23. In some embodiments, the electrical connection key 2141 is on a first surface 211 or a second surface 213 of the tactile feedback body 21, or is on a side surface 212 between the first surface and the second surface. For example, in FIG. 6, the electrical connection key 2141 is on the first surface 211, and in FIG. 7, the electrical connection key 2141 is on the side surface 212. The electrical connection key 2141 is an electrode PIN.

The touch control driver 23 is a control chip (IC).

The tactile feedback structure 2 includes a tactile circuit board 24. The touch control driver 23 is on the tactile circuit board 24, or is on a mainboard or other structures. The tactile circuit board 24 has a connection circuit capable of connecting the touch control driver 23 to the electrical connection key 2141. At least a part of the tactile circuit board 24 is attached to the tactile feedback body 21, and accordingly the connection circuit can be electrically connected to the electrical connection key 2141.

It should be noted that the electrical connection key 2141 is on the first surface 211 or the second surface 213, such that an area for the arrangement of the electrical connection key 2141 is large. When the electrical connection key 2141 is connected and led out through the tactile circuit board 24, there is a great bonding force between the tactile circuit board 24 and the tactile feedback body 21, which makes the structure more stable.

In the embodiments, when the tactile feedback body 21 performs the corresponding tactile feedback action, the vibration of the tactile feedback body 21 is transmitted to the button 1 through the resilient sheet 22 on the surface of the tactile feedback body, and the user can perceive the tactile feedback action through the vibration of the button 1.

It can be understood that, in the embodiments, the touch control driver 23 is electrically connected to the pressure sensor 3, and the pressure sensor 3 directly sends the corresponding action instruction to the touch control driver 23 of the tactile feedback structure. The feedback is fast, with a short delay in execution of the tactile feedback action, and the power consumption is low.

In other embodiments, the pressure sensor may also send a corresponding signal (for example, including an intermediate instruction for calling up another application) to the touch control driver of the tactile feedback structure through a controller of another application (hereinafter referred to as an application controller of a preset application) instead of directly sending the corresponding action instruction to the touch control driver of the tactile feedback structure, and the controller of the other application sends the corresponding action instruction to the touch control driver based on this signal.

Figure 13:
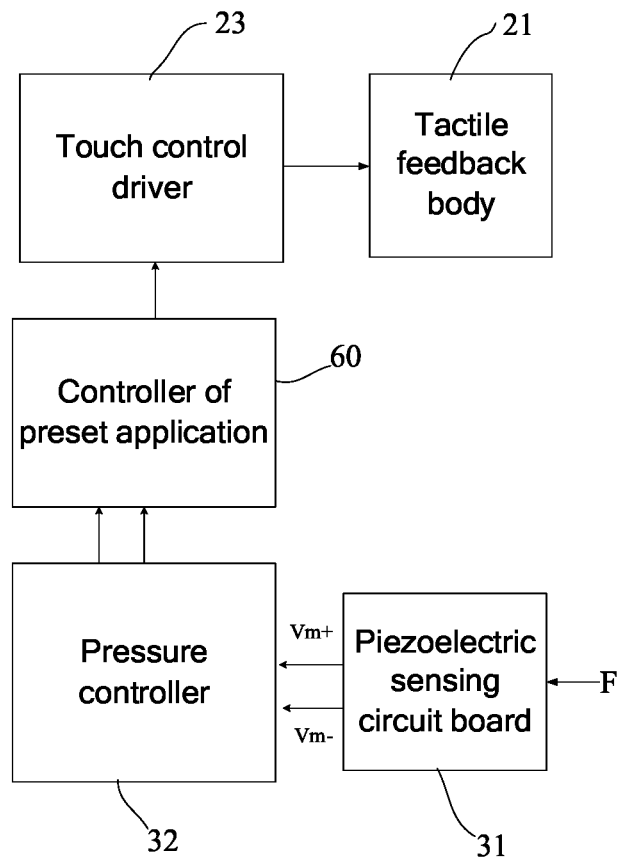
FIG. 13 is a block diagram of a partial structure of another electronic device according to an embodiment.

In combination with FIG. 13, in other embodiments, the touch control driver 23 is connected to the application controller 60 of the preset application, and the application controller 60 of the preset application is electrically connected to the pressure sensor 3.

Accordingly, the pressure sensor 3 sends a corresponding intermediate instruction to the application controller 60 based on the recognized magnitude of the external force F. The application controller 60 sends the corresponding action instruction to the touch control driver 23 based on the intermediate instruction. The touch control driver 23 controls the tactile feedback body 21 to perform the corresponding tactile feedback action based on the action instruction.

In fact, after receiving the intermediate instruction, the application controller 60 may implement a further function or reaction. The user can perform a further operation based on the further function or reaction implemented by the application controller 60, and then the application controller 60 may send the corresponding action instruction to the touch control driver 23 based on the further operation.

In an example where the preset application is a volume control application, an operation (such as sliding) of the button may call up a UI (user interface) of the volume control application. That is, when the user slides the button 1, the pressure sensor 3 recognizes the external force F during the sliding of the button 1 by the user and determines it as a sliding operation, and the pressure sensor 3 is configured to send an intermediate instruction to an application controller of the volume control application based on a determination result, in which the intermediate instruction may be an instruction to call up the UI of the volume control application. For instance, the UI displays a volume adjustment scroll bar through which the user can adjust a volume level. When the user adjusts the volume level, the volume control application senses an adjustment operation and sends a corresponding action instruction to the touch control driver 23 via the application controller. The touch control driver 23 controls the tactile feedback body 21 to perform a corresponding tactile feedback action based on the action instruction.

It can be understood that the application controller of the other application may also directly and automatically perform a further operation after receiving the intermediate instruction sent by the pressure sensor 3, and then send an action instruction corresponding to the further operation to the touch control driver. Alternatively, the application controller may also directly send the corresponding action instruction to the touch control driver based on the intermediate instruction without performing any further operation, in which the application controller is equivalent to an information transfer device.

In some embodiments, the pressure sensor 3 includes a pressure controller 32 and a piezoelectric sensing circuit board 31 electrically connected to the pressure controller 32. The piezoelectric sensing circuit board 31 is attached to the resilient sheet 22, and the deformation of the resilient sheet 22 can cause the piezoelectric sensing circuit board 31 to generate an electrical signal corresponding to the deformation. The pressure controller 32 can determine the magnitude of the external force F based on the electrical signal.

The pressure controller 32 is a control chip (IC).

The pressure controller 32 is on the piezoelectric sensing circuit board 31, or is on a mainboard or other structures.

Figure 9:
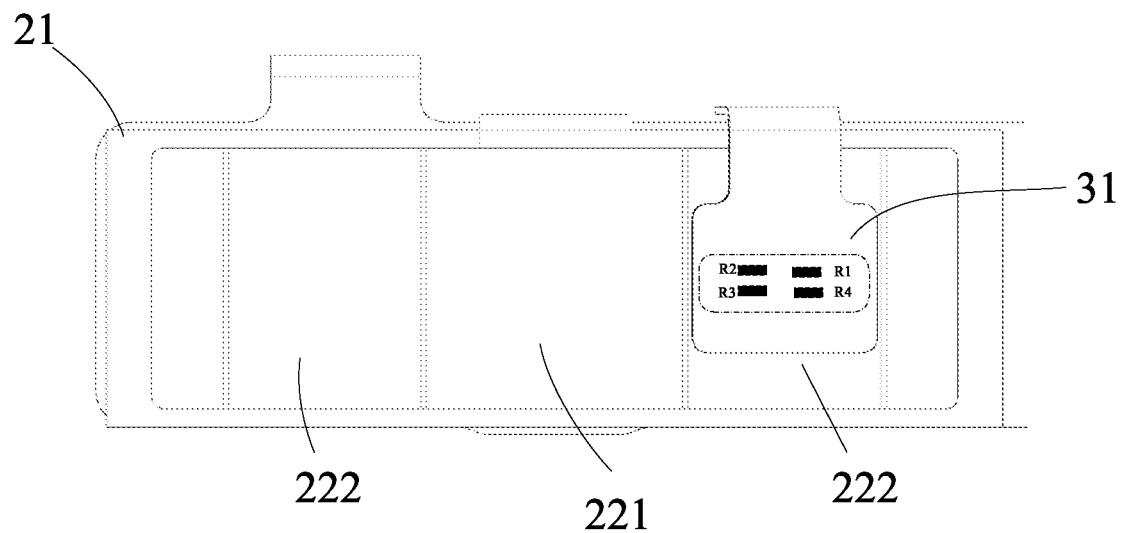
FIG. 9 is a top view of a partial structure of an electronic device according to an embodiment.
Figure 10:
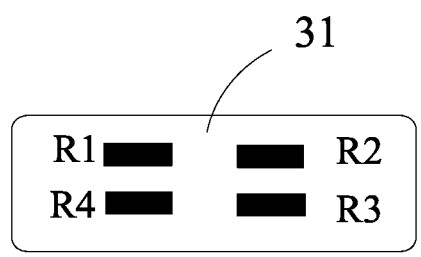
FIG. 10 is a schematic view of an strain gauge arrangement of a piezoelectric sensing circuit board according to an embodiment.
Figure 11:
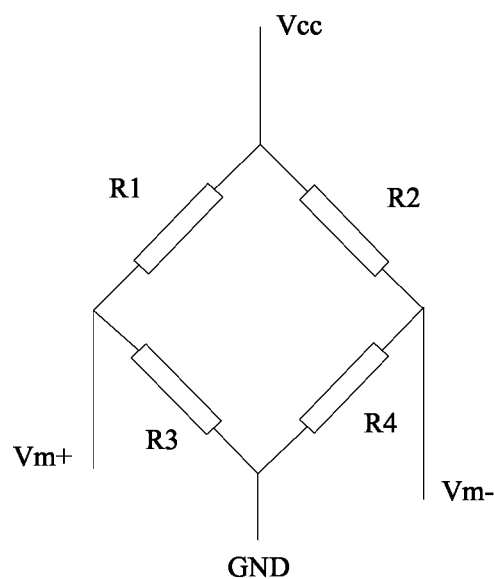
FIG. 11 is a schematic diagram of a strain gauge circuit connection of a piezoelectric sensing circuit board according to an embodiment.
Figure 12:
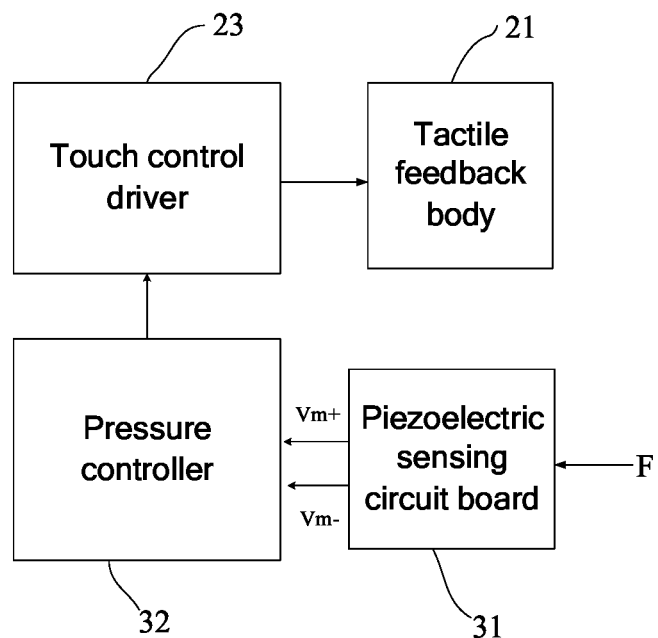
FIG. 12 is a block diagram of a partial structure of an electronic device according to an embodiment.

Referring to FIGS. 8 to 11, there are four strain gauges on the piezoelectric sensing circuit board 31, and the four strain gauges correspond to resistors R1, R2, R3, and R4 respectively. The four strain gauges are arranged on the piezoelectric sensing circuit board 31 in a connection relationship as shown in FIG. 11, forming a Wheatstone bridge structure. Specific positions of the four strain gauges with respect to the resilient sheet 22 are shown in FIG. 9, for example. When the four strain gauges are in a natural state (i.e., a non-stretched state), Vm+ and Vm− are equal. When the four strain gauges are stretched, corresponding resistance values will change; the longer the strain gauges are stretched, the greater the resistance is.

Vcc is an external voltage; GND is a grounding terminal (i.e., voltage is 0); Vm+ and Vm− are two voltage detection points, and accordingly:

$$Vm+ = Vcc*(R3/(R1+R3));$$
$$Vm- = Vcc*(R4/(R2+R4)).$$

Based on the deformation of the resilient sheet 22 shown in FIG. 8 under the action of the external force F, it can be seen that in the resilient sheet 22, the closer to a middle in contact with the button, the greater the deformation is, i.e., the farther away from the middle, the smaller the deformation. When the resilient sheet 22 is subjected to the external force F, the two strain gauges corresponding to R2 and R3 are stretched more, and the corresponding resistance becomes larger. That is, Vm+ and Vm− become different, resulting in a certain difference between Vm+ and Vm−.

The electrical signal corresponding to the deformation can be understood as a signal difference (a voltage difference) between Vm+ and Vm−, and may also be Vm+ and Vm−. Based on the Wheatstone bridge principle, the greater the strain gauge is stretched, the greater the difference between Vm+ and Vm− is, such that the pressure controller 32 can determine the magnitude of the external force F based on the electrical signal.

Accordingly, the relationship between the electrical signal and the magnitude of the external force F can be measured in advance and stored based on specific structures. The pressure controller 32 may correspondingly determine the magnitude of the external force F after obtaining the electrical signal.

In some embodiments, the tactile feedback body 21 has the first surface 211 and the second surface 213 facing away from each other, and the resilient sheet 22 is attached to at least one of the first surface 211 or the second surface 213. One of the first surface 211 and the second surface 213 faces the button 1, and the other thereof faces the support member 4.

Figure 5:
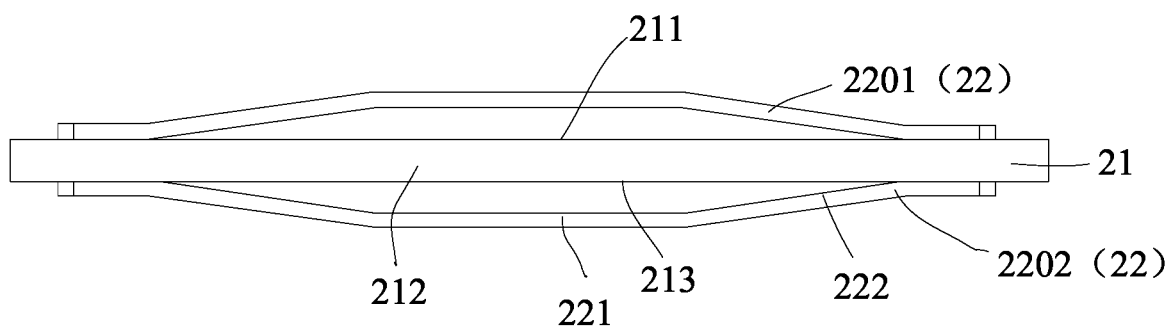
FIG. 5 is a schematic view of a partial structure of a tactile feedback structure according to an embodiment.
Figure 6:
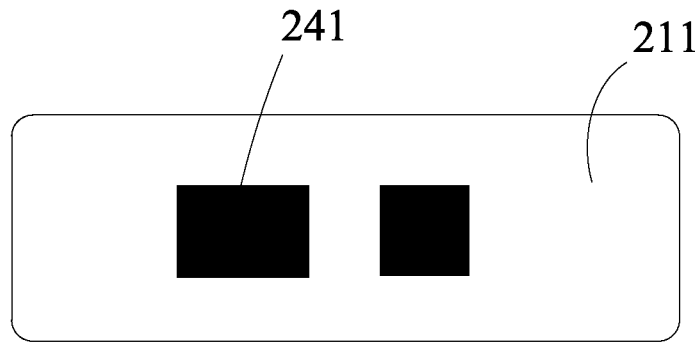
FIG. 6 is a schematic view of electrode mounting for a tactile feedback body according to an embodiment.
Figure 7:
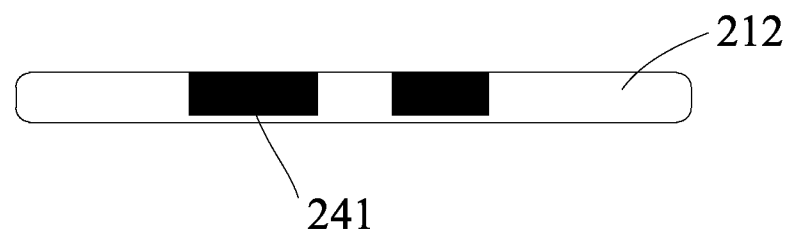
FIG. 7 is a schematic view of electrode mounting for another tactile feedback body according to an embodiment.

For example, as shown in FIG. 5, in some embodiments, both the first surface 211 and the second surface 213 are provided with resilient sheets 22, which are respectively denoted as 2201 and 2202 for the sake of distinguishing the resilient sheets from each other.

Figure 4:
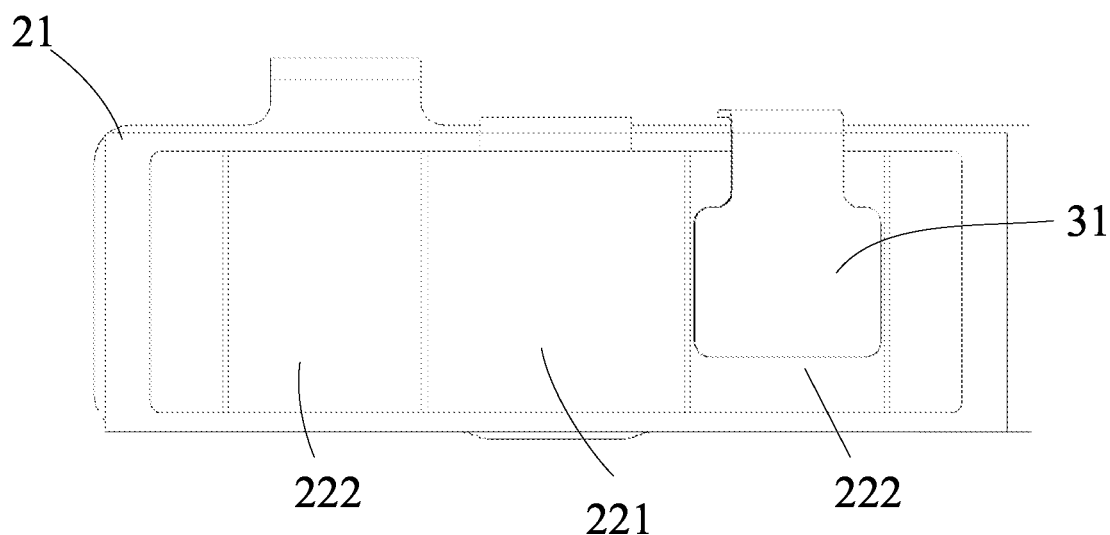
FIG. 4 is a top view of the partial structure shown in FIG. 3.

The resilient sheet 22 includes: a support top portion 221 located in the middle and used for contacting the button 1 or the support member 4; and a deformation portion 222 connected between the support top portion 221 and the tactile feedback body 21 and having an inclined shape. The piezoelectric sensing circuit board 31 is attached to the deformation portion 222, as shown in FIGS. 4 and 9.

In some embodiments, the tactile feedback body 21 includes a plurality of deformation portions 222 that are opposite to each other.

In the above embodiments, there is one pressure sensor 3 on the resilient sheet 22. In other embodiments, there are a plurality of pressure sensors on the resilient sheet 22, and the magnitude of the external force is recognized by the plurality of pressure sensors.

For example, the external force recognition and tactile feedback component 230 includes the plurality of pressure sensors, and each pressure sensor 3 is on one of the deformation portions 222.

It can be understood that the pressure sensor 3 may be attached to a surface of the deformation portion 222 close to the tactile feedback body 21, or the pressure sensor 3 may be attached to a surface of the deformation portion 222 facing away from the tactile feedback body 21 (for example, as shown in FIGS. 4 and 9).

In the above embodiments, the button 1 is on the side frame 11 of the electronic device 100 and is exposed from the side frame 11.

Figure 14:
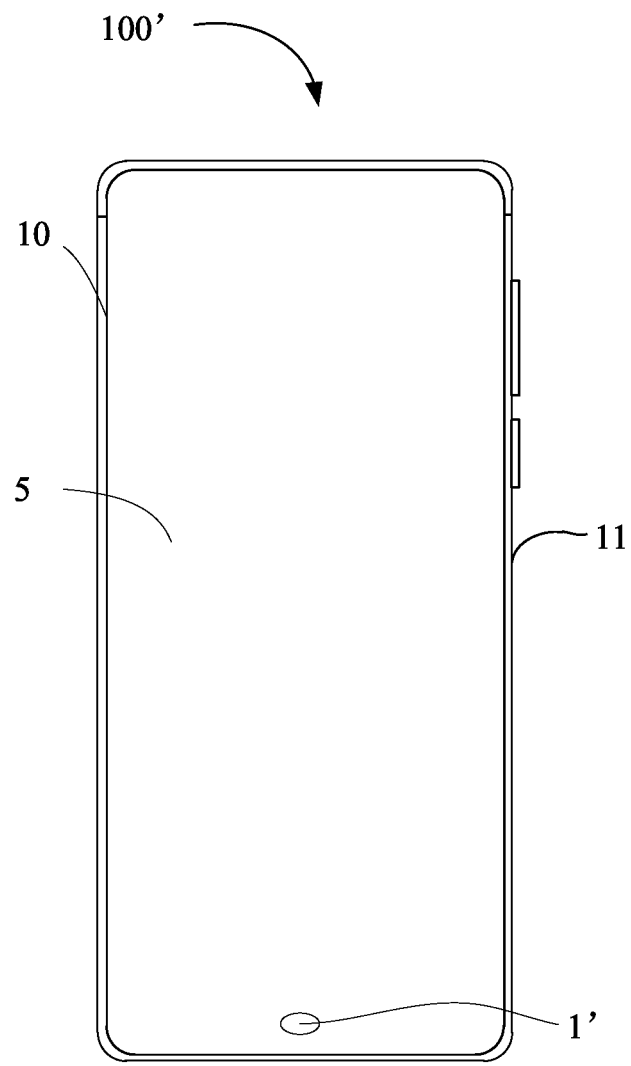
FIG. 14 is a front view of another electronic device according to an embodiment.

In other embodiments, the button may also be on a front surface or a rear surface of the electronic device 100'. For example, as shown in FIG. 14, the front surface, where the display screen 5 is, is provided with the button 1'. The electronic device 100' may be provided with an external force recognition and tactile feedback component corresponding to the button 1'. The external force recognition and tactile feedback component is similar to the external force recognition and tactile feedback component 230 described above, which can refer to the above relevant description.

Figure 15:
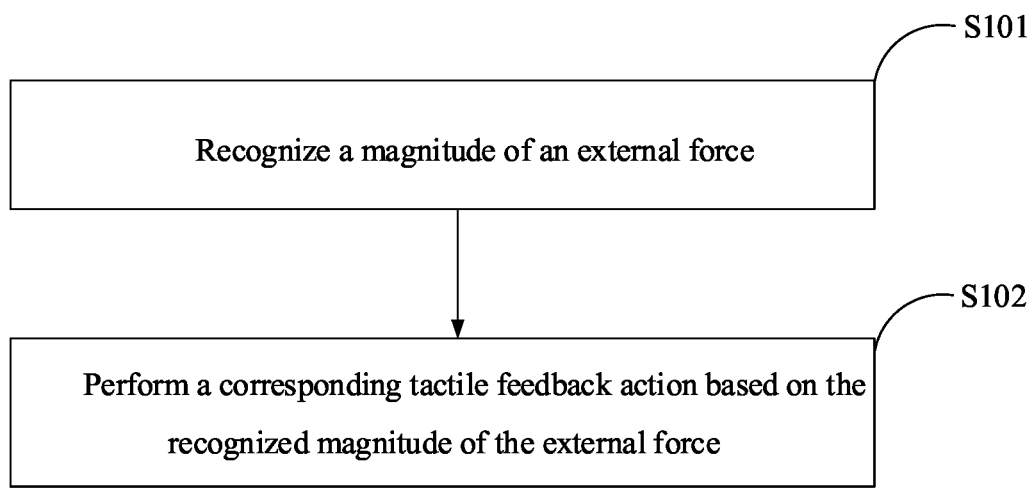
FIG. 15 is a flow chart of an external force recognition and tactile feedback method for an electronic device according to an embodiment.

Referring to FIG. 15, the present disclosure also provides an external force recognition and tactile feedback method for an electronic device. The external force recognition and tactile feedback method includes the following steps: in step S101, recognizing a magnitude of an external force; and in step S102, performing a corresponding tactile feedback action based on the recognized magnitude of the external force.

In some embodiments, the tactile feedback action includes vibration.

In some embodiments, a strength of the tactile feedback action is positively correlated to the magnitude of the external force F exerted on the button 1.

The external force recognition and tactile feedback method is applicable to the electronic device 100 or 100' described in the above embodiments or other similar electronic devices. Steps S101 and S102 may be realized by using the external force recognition and tactile feedback component 230. Specifically, the recognition of the magnitude of the external force F and the tactile feedback action may refer to the above relevant description.

In some embodiments, the method includes determining an operation type of the external force based on the recognized magnitude of the external force F, and performing the tactile feedback action corresponding to the operation type of the external force based on the determined operation type of the external force.

Specifically, the recognition of the magnitude of the external force F, the operation type of the external force, and the tactile feedback action may refer to the above relevant description.

In some embodiments, the external force recognition and tactile feedback component 230 includes a support member 4, a tactile feedback structure 2 on the support member 4, and at least one pressure sensor 3 on the tactile feedback structure 2.

The recognition of the magnitude of the external force F includes: recognizing the magnitude of the external force F by using the pressure sensor 3. The execution of the corresponding tactile feedback action based on the recognized magnitude of the external force F includes: performing the corresponding tactile feedback action by using the tactile feedback structure 2, based on the magnitude of the external force F recognized by the pressure sensor 3.

The details of the pressure sensor 3 and the tactile feedback structure 2 may refer to the above relevant description.

In some embodiments, the tactile feedback structure 2 includes a tactile feedback body 21 capable of performing the tactile feedback action, a touch control driver 23 capable of controlling the tactile feedback body 21 to perform the tactile feedback action, and at least one resilient sheet 22 on the tactile feedback body 21. The resilient sheet 22 is deformed when the button 1 is subjected to the external force F. The pressure sensor 3 is on the resilient sheet 22, and deformation of the resilient sheet 22 causes the pressure sensor 3 to recognize the magnitude of the external force F. The touch control driver 23 is electrically connected to the pressure sensor.

After recognizing the magnitude of the external force F by using the pressure sensor 3, the method further includes: sending a corresponding action instruction to the touch control driver 23 based on the recognized magnitude of the external force F. The execution of the corresponding tactile feedback action by using the tactile feedback structure 2 based on the magnitude of the external force F recognized by the pressure sensor 3: controlling, by the touch control driver 23, the tactile feedback body 21 to perform the corresponding tactile feedback action based on the action instruction. The action instruction includes an action start signal and a tactile feedback action type signal.

The specific structure and the like of the tactile feedback structure 2 may refer to the above relevant description.

It can be understood that, in the embodiments, the touch control driver 23 is electrically connected to the pressure sensor 3, and the pressure sensor 3 directly sends the corresponding action instruction to the touch control driver 23 of the tactile feedback structure. The feedback is fast, with a short delay in execution of the tactile feedback action, and the power consumption is low.

In other embodiments, the pressure sensor may also send a corresponding signal (for example, including an intermediate instruction for calling up another application) to the touch control driver of the tactile feedback structure through a controller of another application (hereinafter referred to as an application controller of a preset application) instead of directly sending the corresponding action instruction to the touch control driver of the tactile feedback structure, and the controller of the other application sends the corresponding action instruction to the touch control driver based on this signal. For example, in other embodiments, the touch control driver 23 is connected to the application controller 60 of the preset application, and the application controller 60 of the preset application is electrically connected to the pressure sensor. The pressure sensor 3 is on the resilient sheet 22.

After recognizing the magnitude of the external force F by using the pressure sensor 3, the method further includes: sending a corresponding intermediate instruction to the application controller 60 based on the recognized magnitude of the external force F. The application controller 60 sends a corresponding action instruction to the touch control driver 23 based on the intermediate instruction. The execution of the corresponding tactile feedback action by using the tactile feedback structure 2 based on the magnitude of the external force F recognized by the pressure sensor 3: controlling, by the touch control driver 23, the tactile feedback body 21 to perform the corresponding tactile feedback action based on the action instruction.

The tactile feedback structure 2 and the preset application may refer to the above relevant description.

In some embodiments, the pressure sensor 3 includes a pressure controller 32 and a piezoelectric sensing circuit board 31 electrically connected to the pressure controller 32. The piezoelectric sensing circuit board 31 is attached to the resilient sheet 22, and the deformation of the resilient sheet 22 can cause the piezoelectric sensing circuit board 31 to generate an electrical signal corresponding to the deformation. The recognition of the magnitude of the external force F by using the pressure sensor 3 includes: obtaining the electrical signal corresponding to the deformation, and determining the magnitude of the external force F based on the electrical signal.

The specific structure and working principle of the pressure sensor 3 may refer to the above relevant description.

The present disclosure provides an electronic device. The electronic device includes: a device main body; a button on the device main body and at least partially exposed out of the device main body; and an external force recognition and tactile feedback component inside the device main body and opposite to the button. The external force recognition and tactile feedback component is configured to recognize a magnitude of an external force and perform a corresponding tactile feedback action based on the recognized magnitude of the external force, when the button is subjected to the external force.

In some embodiments, the external force recognition and tactile feedback component is configured to determine an operation type of the external force based on the recognized magnitude of the external force, and perform the tactile feedback action corresponding to the operation type of the external force based on the determined operation type of the external force.

In some embodiments, the operation type of the external force includes at least one of long pressing, tapping or sliding.

In some embodiments, the external force recognition and tactile feedback component includes: a support member, a tactile feedback structure on the support member, and at least one pressure sensor on the tactile feedback structure; and the pressure sensor is configured to recognize the magnitude of the external force when the button is subjected to the external force, and the tactile feedback structure is configured to perform the corresponding tactile feedback action based on the magnitude of the external force recognized by the pressure sensor.

In some embodiments, the tactile feedback structure includes: a tactile feedback body capable of performing the tactile feedback action, a touch control driver capable of controlling the tactile feedback body to perform the tactile feedback action, and at least one resilient sheet on the tactile feedback body, the resilient sheet is configured to be deformed when the button is subjected to the external force, and the touch control driver is electrically connected to the pressure sensor, the pressure sensor is on the resilient sheet, and deformation of the resilient sheet causes the pressure sensor to recognize the magnitude of the external force; the pressure sensor is configured to sends a corresponding action instruction to the touch control driver based on the recognized magnitude of the external force, and the touch control driver is configured to controls the tactile feedback body to perform the corresponding tactile feedback action based on the action instruction, in which the action instruction includes an action start signal and a tactile feedback action type signal.

In some embodiments, the tactile feedback structure includes a tactile feedback body capable of performing the tactile feedback action, a touch control driver capable of controlling the tactile feedback body to perform the tactile feedback action, and at least one resilient sheet on the tactile feedback body, the resilient sheet is configured to be deformed when the button is subjected to the external force, the touch control driver is connected to an application controller of a preset application, and the application controller of the preset application is electrically connected to the pressure sensor, the pressure sensor is on the resilient sheet, and deformation of the resilient sheet causes the pressure sensor to recognize the magnitude of the external force, the pressure sensor is configured to send a corresponding intermediate instruction to the application controller based on the recognized magnitude of the external force, the application controller is configured to send a corresponding action instruction to the touch control driver based on the intermediate instruction, and the touch control driver is configured to control the tactile feedback body to perform the corresponding tactile feedback action based on the action instruction.

In some embodiments, the pressure sensor includes: a pressure controller and a piezoelectric sensing circuit board electrically connected to the pressure controller, the piezoelectric sensing circuit board is attached to the resilient sheet, and the deformation of the resilient sheet causes the piezoelectric sensing circuit board to generate an electrical signal corresponding to the deformation, and the pressure controller is configured to determine the magnitude of the external force based on the electrical signal.

In some embodiments, the tactile feedback body has a first surface and a second surface facing away from each other, and the resilient sheet is attached to at least one of the first surface or the second surface, in which one of the first surface and the second surface faces the button, and the other thereof faces the support member; the resilient sheet includes a support top portion in the middle and for contact with the button or the support member, and a deformation portion connected between the support top portion and the tactile feedback body and having an inclined shape, in which the piezoelectric sensing circuit board is attached to the deformation portion.

In some embodiments, the tactile feedback body includes a plurality of deformation portions opposite to each other, and the external force recognition and tactile feedback component includes a plurality of pressure sensors, each pressure sensor being on one of the deformation portions.

In some embodiments, the tactile feedback body is made of piezoelectric ceramics, and the tactile feedback structure is a piezoelectric motor.

In some embodiments, the tactile feedback action includes vibration; and/or a strength of the tactile feedback action is positively correlated to the magnitude of the external force exerted on the button.

The present disclosure further provides an external force recognition and tactile feedback method for an electronic device. The external force recognition and tactile feedback method includes recognizing a magnitude of an external force, and performing a corresponding tactile feedback action based on the recognized magnitude of the external force.

In some embodiments, the method further includes determining an operation type of the external force based on the recognized magnitude of the external force, and performing the tactile feedback action corresponding to the operation type of the external force, based on the determined operation type of the external force.

In some embodiments, the operation type of the external force includes at least one of long pressing, tapping or sliding.

In some embodiments, an external force recognition and tactile feedback component of the electronic device includes: a support member, a tactile feedback structure on the support member, and at least one pressure sensor on the tactile feedback structure, recognizing the magnitude of the external force includes recognizing the magnitude of the external force by using the pressure sensor, and performing the corresponding tactile feedback action based on the recognized magnitude of the external force includes performing the corresponding tactile feedback action by using the tactile feedback structure, based on the magnitude of the external force recognized by the pressure sensor.

In some embodiments, the tactile feedback structure includes a tactile feedback body capable of performing the tactile feedback action, a touch control driver capable of controlling the tactile feedback body to perform the tactile feedback action, and at least one resilient sheet on the tactile feedback body, the resilient sheet is configured to be deformed when the button is subjected to the external force, the pressure sensor is on the resilient sheet, and deformation of the resilient sheet causes the pressure sensor to recognize the magnitude of the external force, and the touch control driver is electrically connected to the pressure sensor, after recognizing the magnitude of the external force by using the pressure sensor, the external force recognition and tactile feedback method further includes sending a corresponding action instruction to the touch control driver based on the recognized magnitude of the external force, and performing the corresponding tactile feedback action by using the tactile feedback structure based on the magnitude of the external force recognized by the pressure sensor includes controlling, by the touch control driver, the tactile feedback body to perform the corresponding tactile feedback action based on the action instruction, in which the action instruction includes an action start signal and a tactile feedback action type signal.

In some embodiments, the tactile feedback structure includes a tactile feedback body capable of performing the tactile feedback action, a touch control driver capable of controlling the tactile feedback body to perform the tactile feedback action, and at least one resilient sheet on the tactile feedback body, the resilient sheet is configured to be deformed when the button is subjected to the external force, deformation of the resilient sheet causes the pressure sensor to recognize the magnitude of the external force, the touch control driver is connected to an application controller of a preset application, and the application controller of the preset application is electrically connected to the pressure sensor, and the pressure sensor is on the resilient sheet, after recognizing the magnitude of the external force by using the pressure sensor, the external force recognition and tactile feedback method further includes sending a corresponding intermediate instruction to the application controller based on the recognized magnitude of the external force, and sending a corresponding action instruction by the application controller to the touch control driver based on the intermediate instruction, and performing the corresponding tactile feedback action by using the tactile feedback structure based on the magnitude of the external force recognized by the pressure sensor includes controlling, by the touch control driver, the tactile feedback body to perform the corresponding tactile feedback action based on the action instruction.

In some embodiments, the pressure sensor includes: a pressure controller and a piezoelectric sensing circuit board electrically connected to the pressure controller; the piezoelectric sensing circuit board is attached to the resilient sheet, and the deformation of the resilient sheet causes the piezoelectric sensing circuit board to generate an electrical signal corresponding to the deformation; and recognizing the magnitude of the external force by using the pressure sensor includes: obtaining the electrical signal corresponding to the deformation, and determining the magnitude of the external force based on the electrical signal.

In some embodiments, the tactile feedback action includes vibration; and/or a strength of the tactile feedback action is positively correlated to the magnitude of the external force exerted on the button.

For the electronic device and the external force recognition and tactile feedback method for the electronic device, since the external force recognition and tactile feedback component can recognize the magnitude of the external force and perform the corresponding tactile feedback action based on the recognized magnitude of the external force when the button is subjected to the external force, a user can perceive an action result of a button operation based on the tactile feedback action after the button operation (i.e., perceive whether the button operation is successful), and can also perceive whether the button operation is incorrect based on the tactile feedback action. Hence, user experience can be improved.

Figure 16:
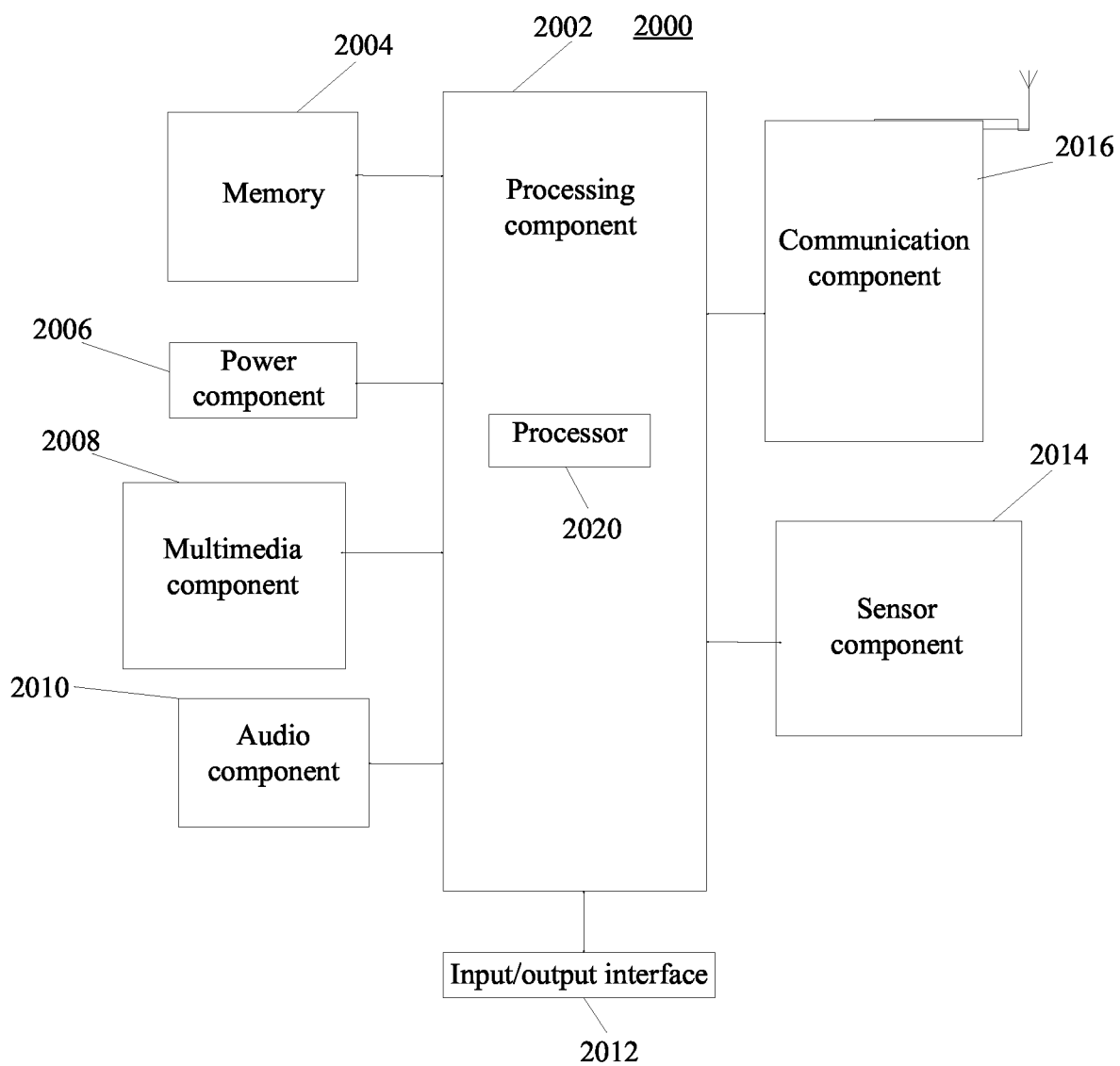
FIG. 16 is a block diagram of an electronic device according to an embodiment.

FIG. 16 is a block diagram of an electronic device 2000 according to an embodiment. For example, the electronic device 2000 may be a mobile phone, a tablet computer, a wearable device or the like.

As shown in FIG. 16, the electronic device 2000 may include one or more of the following components: a processing component 2002, a memory 2004, a power component 2006, a multimedia component 2008, an audio component 2010, an input/output (I/O) interface 2012, a sensor component 2014, and a communication component 2016.

The processing component 2002 typically controls overall operations of the electronic device 2000, such as the operations associated with display, telephone calls, data communication, camera operations, and recording operations. The processing component 2002 may include one or more processors 2020 to execute instructions to perform all or part of the steps in the above described methods. Moreover, the processing component 2002 may include one or more modules which facilitate the interaction between the processing component 2002 and other components. For instance, the processing component 2002 may include a multimedia module to facilitate the interaction between the multimedia component 2008 and the processing component 2002.

The memory 2004 is configured to store various types of data to support the operation of the electronic device 2000.

Examples of such data include instructions for any applications or methods operated on the electronic device 2000, contact data, phonebook data, messages, pictures, video, etc. The memory 2004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2006 provides power to various components of the electronic device 2000. The power component 2006 may include a power management system, one or more power sources, and any other components associated with the generation, management, and distribution of power in the electronic device 2000.

The multimedia component 2008 includes a screen providing an output interface between the electronic device 2000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2008 includes a front camera and/or a rear camera. The front camera and the rear camera may receive an external multimedia datum while the electronic device 2000 is in an operation mode, such as a photographing mode or a video mode. Each of the front camera and the rear camera may be a fixed optical lens system or have focus and optical zoom capability.

The audio component 2010 is configured to output and/or input audio signals. For example, the audio component 2010 includes a microphone ("MIC") configured to receive an external audio signal when the electronic device 2000 is in an operation mode, such as a call mode, a recording mode, and a voice recognition mode. The received audio signal may be further stored in the memory 2004 or transmitted via the communication component 2016. In some embodiments, the audio component 2010 further includes a speaker to output audio signals.

The I/O interface 2012 provides an interface between the processing component 2002 and peripheral interface modules, such as a security keyboard, a click wheel, buttons, and the like. The buttons may include, but are not limited to, a home button, a volume button, a starting button, and a locking button.

The sensor component 2014 includes one or more sensors to provide status assessments of various aspects of the electronic device 2000. For instance, the sensor component 2014 may detect an open/closed status of the electronic device 2000, relative positioning of components, e.g., the display and the security keypad, of the electronic device 2000, a change in position of the electronic device 2000 or a component of the electronic device 2000, a presence or absence of user contact with the electronic device 2000, an orientation or an acceleration/deceleration of the electronic device 2000, and a change in temperature of the electronic device 2000. The sensor component 2014 may include a proximity sensor configured to detect the presence of nearby objects without any physical contact. The sensor component 2014 may also include a light sensor, such as a CMOS or CCD image sensor, for use in imaging applications. In some embodiments, the sensor component 2014 may also include an accelerometer sensor, a gyroscope sensor, a magnetic sensor, a pressure sensor, or a temperature sensor.

The communication component 2016 is configured to facilitate communication, wired or wirelessly, between the electronic device 2000 and other devices. The electronic device 2000 can access a wireless network based on any communication standard, such as Wi-Fi, 2G, 3G, 4GLTE, 5GNR or a combination thereof. In an embodiment, the communication component 2016 receives a broadcast signal or broadcast associated information from an external broadcast management system via a broadcast channel. In an embodiment, the communication component 2016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the electronic device 2000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 2004, executable by the processor 2020 in the electronic device 2000, for performing the above-described methods. For example, the non-transitory computer-readable storage medium may be a ROM, a RAM, a CD-ROM, a magnetic tape, a floppy disc, an optical data storage device, and the like.

Other embodiments of the present disclosure may be conceivable for those skilled in the art after considering the specification and practicing the technical solutions disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are regarded as exemplary only, and the true scope and spirit of the present disclosure are indicated by the appended claims.

It should be understood that the present disclosure is not limited to the particular structures described above and shown in the drawings, and various modifications and changes can be made without departing from the scope of the present disclosure. The scope of the present disclosure is only limited by the appended claims.

Obviously, numerous modifications and variations of the present invention are possible in light of the above teachings. It is therefore to be understood that within the scope of the appended claims, the invention may be practiced otherwise than as specifically described herein.

The invention claimed is:

1. An electronic device, comprising:
a device main body;
a button on the device main body and at least partially exposed out of the device main body; and
an external force recognition and tactile feedback component inside the device main body and opposite to the button;

wherein the external force recognition and tactile feedback component is configured to recognize a magnitude of an external force and perform a corresponding tactile feedback action based on the recognized magnitude of the external force, when the button is subjected to the external force, wherein the external force recognition and tactile feedback component comprises: a support member, a tactile feedback structure on the support member, and at least one pressure sensor on the tactile feedback structure; and the pressure sensor is configured to recognize the magnitude of the external force when the button is subjected to the external force, and the tactile feedback structure is configured to perform the corresponding tactile feedback action based on the magnitude of the external force recognized by the pressure sensor;

where the tactile feedback structure comprises: a tactile feedback body capable of performing the tactile feedback action, a touch control driver capable of controlling the tactile feedback body to perform the tactile feedback action, and at least one resilient sheet on the tactile feedback body;

the resilient sheet is configured to be deformed when the button is subjected to the external force, and the touch control driver is electrically connected to the pressure sensor;

the pressure sensor is on the resilient sheet, and the deformation of the resilient sheet causes the pressure sensor to recognize the magnitude of the external force;

the pressure sensor is configured to send a corresponding action instruction to the touch control driver based on the recognized magnitude of the external force, and the touch control driver is configured to control the tactile feedback body to perform the corresponding tactile feedback action based on the action instruction, wherein the action instruction comprises an action start signal and a tactile feedback type signal; and wherein the button is in contact with resilient sheet.

2. The electronic device according to claim 1, wherein the external force recognition and tactile feedback component is configured to determine an operation type of the external force based on the recognized magnitude of the external force, and perform the tactile feedback action corresponding to the operation type of the external force based on the determined operation type of the external force.

3. The electronic device according to claim 2, wherein the operation type of the external force comprises at least one of long pressing, tapping or sliding.

4. The electronic device according to claim 1, wherein:
the tactile feedback structure comprises: a tactile feedback body capable of performing the tactile feedback action, a touch control driver capable of controlling the tactile feedback body to perform the tactile feedback action, and at least one resilient sheet on the tactile feedback body;

the resilient sheet is configured to be deformed when the button is subjected to the external force; the touch control driver is connected to an application controller of a preset application, and the application controller of the preset application is electrically connected to the pressure sensor;

the pressure sensor is on the resilient sheet, and deformation of the resilient sheet causes the pressure sensor to recognize the magnitude of the external force;

the pressure sensor is configured to send a corresponding intermediate instruction to the application controller based on the recognized magnitude of the external force; the application controller is configured to send a corresponding action instruction to the touch control driver based on the intermediate instruction; and the touch control driver is configured to control the tactile feedback body to perform the corresponding tactile feedback action based on the action instruction.

5. The electronic device according to claim 1, wherein:
the pressure sensor comprises: a pressure controller and a piezoelectric sensing circuit board electrically connected to the pressure controller;

the piezoelectric sensing circuit board is attached to the resilient sheet, and the deformation of the resilient sheet causes the piezoelectric sensing circuit board to generate an electrical signal corresponding to the deformation; and the pressure controller is configured to determine the magnitude of the external force based on the electrical signal.

6. The electronic device according to claim 5, wherein:
the tactile feedback body has a first surface and a second surface facing away from each other, and the resilient sheet is attached to at least one of the first surface or the second surface, wherein one of the first surface and the second surface faces the button, and the other thereof faces the support member;

the resilient sheet comprises: a support top portion in the middle and for contact with the button or the support member; and a deformation portion connected between the support top portion and the tactile feedback body and having an inclined shape, wherein the piezoelectric sensing circuit board is attached to the deformation portion.

7. The electronic device according to claim 6, wherein the tactile feedback body comprises a plurality of deformation portions opposite to each other, and the external force recognition and tactile feedback component comprises a plurality of pressure sensors, each pressure sensor being on one of the deformation portions.

8. The electronic device according to claim 1, wherein the tactile feedback body is made of piezoelectric ceramics, and the tactile feedback structure is a piezoelectric motor.

9. The electronic device according to claim 1, wherein the tactile feedback action comprises vibration.

10. An external force recognition and tactile feedback method for an electronic device, comprising:
recognizing a magnitude of an external force; and
performing a corresponding tactile feedback action based on the recognized magnitude of the external force,
wherein an external force recognition and tactile feedback component of the electronic device comprises: support member, a tactile feedback structure on the support member; and at least one pressure sensor on the tactile feedback structure;

recognizing the magnitude of the external force comprises: recognizing the magnitude of the external force by using the pressure sensor, and performing the corresponding tactile feedback action based on the recognized magnitude of the external force comprises: performing the corresponding tactile feedback action by using the tactile feedback structure, based on the magnitude of the external force recognized by the pressure sensor;

wherein the tactile feedback structure comprises: a tactile feedback body capable of performing the tactile feedback action, a touch control driver capable of controlling the tactile feedback body to perform the tactile feedback action, and at least one resilient sheet on the tactile feedback body; the resilient sheet is configured to be deformed when the button is subjected to the external force, the pressure sensor is on the resilient sheet, and deformation of the resilient sheet causes the pressure sensor to recognize the magnitude of the external force; and the touch control driver is electrically connected to the pressure sensor;

after recognizing the magnitude of the external force by using the pressure sensor, the external force recognition and tactile feedback method further comprises: sending a corresponding action instruction to the touch control driver based on the recognized magnitude of the external force; and performing the corresponding tactile feedback action by using the tactile feedback structure based on the magnitude of the external force recognized by the pressure sensor comprises: controlling, by the touch control driver, the tactile feedback body to perform the corresponding tactile feedback action based on the action instruction, wherein the action instruction comprises an action start signal and a tactile feedback action type signal; and wherein the button is in contact with the resilient sheet.

11. The external force recognition and tactile feedback method according to claim 10, further comprising:

determining an operation type of the external force based on the recognized magnitude of the external force; and performing the tactile feedback action corresponding to the operation type of the external force, based on the determined operation type of the external force.

12. The external force recognition and tactile feedback method according to claim 11, wherein the operation type of the external force comprises at least one of long pressing, tapping or sliding.

13. The external force recognition and tactile feedback method according to claim 10, wherein:

the tactile feedback structure comprises: a tactile feedback body capable of performing the tactile feedback action, a touch control driver capable of controlling the tactile feedback body to perform the tactile feedback action, and at least one resilient sheet on the tactile feedback body; the resilient sheet is configured to be deformed when the button is subjected to the external force; deformation of the resilient sheet causes the pressure sensor to recognize the magnitude of the external force; the touch control driver is connected to an application controller of a preset application, and the application controller of the preset application is electrically connected to the pressure sensor; and the pressure sensor is on the resilient sheet;

after recognizing the magnitude of the external force by using the pressure sensor, the external force recognition and tactile feedback method further comprises: sending a corresponding intermediate instruction to the application controller based on the recognized magnitude of the external force; and sending a corresponding action instruction by the application controller to the touch control driver based on the intermediate instruction; and performing the corresponding tactile feedback action by using the tactile feedback structure based on the magnitude of the external force recognized by the pressure sensor comprises: controlling, by the touch control driver, the tactile feedback body to perform the corresponding tactile feedback action based on the action instruction.

14. The external force recognition and tactile feedback method according to claim 10, wherein:

the pressure sensor comprises: a pressure controller and a piezoelectric sensing circuit board electrically connected to the pressure controller; the piezoelectric sensing circuit board is attached to the resilient sheet, and the deformation of the resilient sheet causes the piezoelectric sensing circuit board to generate an electrical signal corresponding to the deformation; and recognizing the magnitude of the external force by using the pressure sensor comprises: obtaining the electrical signal corresponding to the deformation, and determining the magnitude of the external force based on the electrical signal.

15. The external force recognition and tactile feedback method according to claim 10, wherein:

the tactile feedback action comprises vibration.

* * * * *